(12) United States Patent
Ohashi

(10) Patent No.: US 7,304,803 B2
(45) Date of Patent: Dec. 4, 2007

(54) ZOOM LENS UNIT, IMAGING DEVICE AND PHOTOGRAPHING DEVICE

(75) Inventor: Kazuyasu Ohashi, Funabashi (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 11/582,329

(22) Filed: Oct. 18, 2006

(65) Prior Publication Data

US 2007/0097517 A1 May 3, 2007

(30) Foreign Application Priority Data

Oct. 19, 2005 (JP) .............................. 2005-304445

(51) Int. Cl.
*G02B 15/14* (2006.01)

(52) U.S. Cl. ...................... 359/686; 359/683; 359/684; 359/685; 359/687; 359/689; 359/690; 359/715; 359/716; 359/740

(58) Field of Classification Search ........ 359/683–687, 359/689, 690, 713–716, 740
See application file for complete search history.

(56) References Cited

U.S. PATENT DOCUMENTS

| | | | |
|---|---|---|---|
| 5,054,898 A * | 10/1991 | Kitagishi et al. ........... 359/683 |
| 5,153,779 A | 10/1992 | Ohashi | |
| 5,398,135 A | 3/1995 | Ohashi | |
| 5,576,891 A | 11/1996 | Ohashi | |
| 5,581,319 A | 12/1996 | Ohashi | |
| 5,617,254 A | 4/1997 | Ohashi | |
| 5,630,188 A | 5/1997 | Ohashi | |
| 5,687,401 A | 11/1997 | Kawamura et al. | |
| 5,930,056 A | 7/1999 | Ohashi | |
| 6,353,506 B1 | 3/2002 | Ohashi | |

(Continued)

FOREIGN PATENT DOCUMENTS

DE 41 36 710 A1 5/1992

(Continued)

OTHER PUBLICATIONS

H. Ed. Gobrecht, "Bergmann—Schaefer Lehrbuch der Experimentalphysik, Bd. III Optik", XP-002422674, 1987 pp. 353-357.

(Continued)

*Primary Examiner*—Evelyn A. Lester
(74) *Attorney, Agent, or Firm*—Oblon, Spivak, McClelland, Maier & Neustadt, P.C.

(57) ABSTRACT

A zoom lens unit includes: a positive first lens group; a negative second lens group; and a positive subsequent lens group as a whole, the subsequent lens group includes a third lens group, and an aperture stop is disposed between the second lens group and the third lens group, and a lens construction including the first and the second lens groups satisfies the condition (1): $1.0 < r_i/r_{i+1} < 5.0$, in which $r_i$ and $r_{i+1}$ are curvature radii of lens surfaces $S_i$ and $S_{i+1}$ in the lens construction, respectively, the lens surfaces $S_i$ and $S_{i+1}$ being "i"th and "i+1"th lens surfaces, respectively, counted from the object side, and a reflectivity-reducing treatment adapted to reduce intensity of a ghost image is performed on each lens surface forming at least one of pairs of lens surfaces satisfying the condition (1).

22 Claims, 9 Drawing Sheets

| U.S. PATENT DOCUMENTS | | | | FOREIGN PATENT DOCUMENTS | | |
|---|---|---|---|---|---|---|
| 6,525,885 B2 | 2/2003 | Ohashi | | JP | 7-128501 | 5/1995 |
| 6,747,818 B2 | 6/2004 | Ohashi et al. | | JP | 2901144 | 3/1999 |
| 6,771,433 B2 | 8/2004 | Ohashi | | JP | 2991554 | 10/1999 |
| 6,829,102 B2 | 12/2004 | Ohashi et al. | | JP | 2001-324676 | 11/2001 |
| 6,839,183 B2 | 1/2005 | Ohashi | | JP | 2005-92115 | 4/2005 |
| 6,839,185 B2 | 1/2005 | Ohashi | | | | |
| 2002/0060855 A1 | 5/2002 | Ohashi | | | | |
| 2003/0180476 A1 | 9/2003 | Yamashita et al. | | | | |
| 2005/0094002 A1 | 5/2005 | Ohashi | | | | |
| 2005/0122596 A1 | 6/2005 | Ohashi | | | | |
| 2005/0190457 A1 | 9/2005 | Ohashi | | | | |

OTHER PUBLICATIONS

H. A. Macleod, "Antireflection coatings", Thin-Film Optical Filters, XP-002394456, Chapter 3.2.3, 2001 pp. 86-157.

* cited by examiner

ZOOM LENS UNIT, IMAGING DEVICE AND PHOTOGRAPHING DEVICE

BACKGROUND

1. Field of the Invention

The present invention relates to a zoom lens unit, an imaging device and a photographing device.

2. Description of Related Art

Such a zoom lens unit, which includes in order from an object side: a first lens group having a positive refracting power; a second lens group having a negative refracting power; and a subsequent lens group comprising one or more lens groups and having a positive refracting power as a whole, and an aperture stop disposed between the second lens group and the subsequent lens group, wherein when changing a modification from a wide angle end to a telephoto end, a distance between the first lens group and the second lens group increases, and a distance between the second lens group and the subsequent lens group decreases, is suitable for "miniaturization and high magnification ratio", and is embodied widely for video camera and digital camera as the zoom lens unit therefor.

The zoom lens unit with such a structure is most common for "a zoom lens unit for digital camera" with a magnification ratio more than 4 times, as well as the zoom lens unit for the video camera having the magnification ratio of 10 times or more as a matter of course. In such a zoom lens unit, a total of 6 or more than 6 lenses are often used in "the first and the second lens groups located nearer to the object side than the aperture stop", due to the necessity of the aberration correction.

In a case that the photographing is taken in a state so-called "state of backlit" that a strong light source such as the sun exists in or neighbourhood at the photographing screen, a ghost image formed by round trip lights due to reflection between two lens surfaces reaching the image plane, is generated depending on the lens structure. Since in general the zoom lens unit is constructed by the large number of lenses, measures against the ghost image are an important technological issue.

Especially, reflection between lens surface to lens surface which are nearer to the object side than the aperture stop, reaches the image plane to generate the ghost image easily, and the measures against the ghost image are extremely important in the zoom lens unit like above-mentioned, in which the number of the lens forming the first and the second lens groups is comparatively increased.

Recently, there are many users requiring the wider field angle of zoom lens unit. For the zoom lens unit with structures mentioned above, a half field angle of 38 degrees or more at the wide angle end is also proposed, and thus it becomes easy that the light causing the ghost image appears in a screen, simply because the field angle is wide.

Moreover, when the field angle of the zoom lens unit like above-mentioned is widened, the diameters of the first and the second lens groups tend to increase easily, and even in the case that the light source causing the ghost image exists outside of the screen, the generation probability of the ghost image caused by the reflection between the lens surface to lens surface of the first and the second lens group is high. In the case that the strong light source exists in the photographing screen, the ghost image is easily tolerated because it is not so distinguished, as compared with an image of the strong light source, while in the case that the light source is outside of the photographing screen, the ghost image is difficult to be tolerated since it is apt to be distinguished.

Measures against the ghost image for the zoom lens unit are disclosed in JP-A-2001-324676, JP-2991554 B.

The zoom lens unit disclosed in JP-A-2001-324676 is a zoom lens unit like above mentioned, its first lens group includes a bonded surface, and reduction of the ghost image is obtained by inhibiting the reflection on the bonded surface. However, as an embodiment, only a zoom lens unit with a half field angle at a wide angle end being smaller than 34 degrees is described specifically, and the inhibition of the ghost image in a case that the half field angle at the wide angle end is 38 degrees or more is uncertain.

In JP-2991554 B, there has been disclosed to apply a reflection inhibiting coat having reflection characteristics of mutually complementary relation, on two or more reflection boundary surfaces causing the ghost image, so as to prevent the generation of the ghost image in wide wavelength range. However, there is no specific data about the zoom lens unit itself, and the magnification ratio and the half field angle at the wide angle end are uncertain.

SUMMARY

An object of the present invention is to effectively inhibit a ghost image caused by reflection between lens surface to lens surface of a first and a second lens groups located nearer to an object side than an aperture stop in a zoom lens unit.

A zoom lens unit according to the present invention comprises: a first lens group having a positive refracting power; a second lens group having a negative refracting power; and a subsequent lens group comprising one or more lens groups and having a positive refracting power as a whole, said one or more lens groups comprising a third lens group, the first lens group, the second lens group and the subsequent lens group being arranged in this order from an object side to an image side, and an aperture stop disposed between the second lens group and the third lens group. When changing a magnification from a wide angle end to a telephoto end, a distance between the first lens group and the second lens group increases, while a distance between the second lens group and the subsequent lens group decreases.

(a) The zoom lens unit according to the present invention has the following characteristics. In other words, a lens construction including the first and the second lens groups satisfies the condition (1):

$$1.0 < r_i/r_{i+1} < 5.0$$

in which $r_i$ and $r_{i+1}$ are curvature radii of lens surfaces $S_i$ and $S_{i+1}$ in the lens construction, respectively, the lens surfaces $S_i$ and $S_{i+1}$ being "i"th and "i+1"th lens surfaces, respectively, counted from the object side, and wherein a reflectivity-reducing treatment adapted to reduce intensity of a ghost image is performed on each lens surface forming at least one of pairs of lens surfaces satisfying the condition (1).

Following are preferred embodiments (b)-(m) of the zoom lens unit according to the present invention. Any combination thereof may be considered to be preferred ones of the present invention unless any contradictions occur.

(b) The zoom lens unit according to a preferable embodiment of the present invention has the following characteristics. In other words, the lens construction including the first and the second lens groups satisfies the condition (1A):

$$2.0 < r_i/r_{i+1} < 5.0$$

in which $r_i$ and $r_{i+1}$ are curvature radii of lens surfaces $S_i$ and $S_{i+1}$ in the lens construction, respectively, the lens surfaces $S_i$ and $S_{i+1}$ being "i"th and "i+1"th lens surfaces, respectively, counted from the object side, and wherein the reflectivity-reducing treatment adapted to reduce intensity of the ghost image is performed on each lens surface forming at least one of pairs of lens surfaces satisfying the condition (1A).

(c) The reflectivity-reducing treatment can be performed on the lens surfaces forming at least one of the pairs of lens surfaces satisfying the condition (1) or (1A), and the treatment can also be performed on the lens surfaces forming all the pair or pairs of lens surfaces satisfying the condition (1) or (1A).

(d) In the zoom lens unit according to a preferable embodiment of the present invention, the reflectivity-reducing treatment performed on the lens surface gives a refractivity $R_{200}$ (unit: %): $R_{200} < 0.7$ (2) for a flux of a perpendicular incident light in a range of wavelength 450-650 nm. It is similar in the following explanation.

(e) In the zoom lens unit according to a preferable embodiment of the present invention, within a range of wavelength 450-650 nm with respect to the perpendicular incident light flux, each lens surface forming at least one of the pairs of lens surfaces satisfying the condition (1) or (1A) exhibits that: in a wavelength range the reflectivity is equal to or less than 0.3%; and in a wavelength range the reflectivity is more than 0.3%, and the reflectivity-reducing treatment on said each lens surface is performed such that the reflectivity of one or both of said lens surfaces is equal to or less than 0.3% over the range of wavelength 460-650 nm.

More specifically, taken a spectral reflectivity of these lens surfaces as a spectral reflectivity of one pair of lens surfaces, for any wavelength within the wavelength range 450-650 nm, the reflectivity of one or both of the lens surfaces is equal to or less than 0.3%.

(f) In the zoom lens unit according to a preferable embodiment of the present invention, the reflectivity-reducing treatment of each lens surface can be performed such that, in a desired continuous wavelength range within wavelength 450-650 nm, with respect to the perpendicular incident light flux, the reflectivity of each lens surface forming at least one of the pairs of lens surfaces satisfying the condition (1) or (1A), is equal to or less than 0.3%.

The desired continuous wavelength range for each lens surface is a continuous wavelength range structuring a part within wavelength 450-650 nm, and the desired continuous wavelength range can be the same for the mutual lenses, or also for example can be overlapped by 80% or more than 80%. Subject to a condition that the spectral reflectivity in the desired continuous wavelength range for each lens surface is equal to or less than 0.3%, the desired continuous wavelength range for each lens surface can be same or different mutually.

The zoom lenses described in (a) and (b), comprise respectively one or more than one pair of lens surfaces $S_i$ and $S_{i+1}$, satisfying the conditions (1) and (1A) respectively.

For the zoom lens unit according to any one of (a) to (f), the reflectivity-reducing treatment performed on the lens surface is not merely a treatment adapted to reduce the reflectivity, it is also a treatment adapted to reduce the intensity of the ghost image to a level that can be tolerated. In particular, the reflectivity-reducing treatment can include a multilayer film being layered on the lens surface and having a function of reducing the reflectivity (a kind of film that thin layers of low refractive index and thin layers of high refractive index are alternately lamination layered, i.e. a so-called multi-coating); and/or a subwavelength structure being formed as a surface shape of the lens surface to reduce the reflectivity.

The subwavelength structure is a minute relief structure being formed as a surface shape of the lens surface and having pitches equal to or lower than the wavelength, and the optical functions such as the reflection films and the anti-reflection films can be achieved by adjusting the pitch or the fill factor and the aspect ratio etc. of the relief structure. The above-mentioned reflectivity-reducing treatment can be achieved by such a subwavelength structure, Between a pair of lens surfaces $S_i$ and $S_{i+1}$, it is possible to perform the reflectivity-reducing treatment on the lens surface $S_i$ by multilayer film, and perform the reflectivity-reducing treatment on the lens surface $S_{i+1}$ by subwavelength structure.

To give a simple supplement to the pair of lens surfaces, in the first and the second lens groups, for example, when considering the lens surfaces, $S_2$, $S_3$, $S_4$, $S_5$, if the lens surfaces $S_2$ and $S_3$ satisfy the condition (1) or (1A), the lens surfaces $S_3$ and $S_4$ satisfy the condition (1) or ($_1$A), and the lens surfaces $S_4$ and $S_5$ satisfy the condition (1) or (1A) (the pairs of lens surfaces that satisfy the condition (1) or (1A) are three), i.e., there are the pair of lens surfaces $S_2$, $S_3$ the pair of lens surfaces $S_3$, $S_4$, and the pair of lens surfaces $S_4$, $S_5$. In other words, one lens surface may be an either lens surface or the other lens surface in two pairs of lens surfaces.

(h) For the zoom lens unit according to any one of (a) to (g), it is possible to structure the zoom lens unit such that; the first lens group is structured by three lenses in order from the object side: a negative lens L1 having a large curvature surface on the image side; a positive meniscus lens L2 having a convex surface on the object side; and a positive lens L3 having a convex surface on the object side, wherein the positive meniscus lens L2 has the lens surface $S_i$ on the image side, the positive lens L3 has the lens surface $S_{i+1}$ on the object side, and the lens surface $S_i$ and the lens surface $S_{i+1}$ satisfy the condition (1) or (1A).

(i) For the zoom lens unit according to any one of (a) to (g), it is possible to structure the zoom lens unit such that: a lens surface nearest to the image side of the first lens group is a concave surface, a lens surface nearest to the object side of the second lens group is a convex surface, and the concave and convex lens surfaces satisfy the condition (1) or (1A).

(j) In the zoom lens unit according to any one of (a) to (i), the subsequent lens group comprises the third lens group having a positive refracting power and a fourth lens group having a positive refracting power, and when changing the magnification from the wide angle end to the telephoto end, the first lens group and the third lens group move to the object side.

(k) For the zoom lens unit according to (j), it is preferable to satisfy the conditions:

$$0.30 < X1/fT < 0.85 \quad (3),$$

$$0.15 < X3/fT < 0.50 \quad (4),$$

in which X1 is a total displacement of the first lens group when changing the magnification from the wide angle end to the telephoto end, X3 is a total displacement of the third lens group when changing the magnification from the wide angle end to the telephoto end, and fT is a focal length of the entire system at the telephoto end.

(l) In the case of (k), it is preferable to satisfy the condition:

$$0.70 < Y'_{max}/f_W < 1.00 \quad (5),$$

in which $f_W$ is a focal length of the entire system at the wide angle end, and $Y'_{max}$ is a maximum image height.

The "maximum image height" is the largest image height that can achieve the required optical performances.

(m) For the zoom lens unit according to any one of (a) to (l), the magnification ratio can be not less than about 4.5 times, and a half field angle at the wide angle end can be not less than 38 degrees.

(n) An imaging device according to the present invention comprises: an area-type light receiving element; and an optical system for photographing which forms an image of a photographic object onto the light receiving element, wherein the zoom lens unit according to any one of (a) to (m) is used as the optical system for photographing.

A photographing device according to the present invention comprises the imaging device according to (n). The photographing device can be structured as a camera or a mobile information terminal.

To supplement the explanation, the inventor newly found the following facts.

Namely, in the zoom lens unit, which includes: a first lens group having a positive refracting power; a second lens group having a negative refracting power; and a subsequent lens group comprising one or more lens groups and having a positive refracting power as a whole, said one or more lens groups comprising a third lens group, the first lens group and the second lens group and the subsequent lens group being arranged in this order from an object side to an image side, and an aperture stop disposed between the second lens group and the third lens group, wherein when changing a magnification from a wide angle end to a telephoto end, a distance between the first lens group and the second lens group increases, and a distance between the second lens group and the subsequent lens group decreases, a ghost image caused by the first and the second lens groups located nearer to the object side than the aperture stop is easily generated.

It is possible to generate the ghost image if a round trip reflection light between arbitrary two surfaces reaches the image plane, and if the light collection efficiency is high, the ghost image becomes greatly bright and distinguished.

In case of the conditions (1) and (1A) are satisfied, the orientation of the curve of the surface of the lens surfaces $S_i$ and $S_{i+1}$ is the same orientation in the optical axis direction. When the light reflected by the lens surface $S_{i+1}$ is further reflected by the lens surface $S_i$, the reflected light tends to advance in a direction close to a direction of a light incident to the lens surface $S_{i+1}$, originally, therefore a ghost image with a high light collection efficiency tends to be generated at the wide angle end in the magnification range or its neighbourhood.

That is, the light further reflected by the lens surface $S_i$ after being reflected by the lens surface $S_{i+1}$ reaches the image plane with a high light collection efficiency and tends to generate a bright ghost image, where the lens surfaces $S_i$ and $S_{i+1}$ are a pair of lens surfaces satisfying the conditions (1) and (1A). In addition, since ghost image is generated on a side nearer to the optical axis than an image of the light source itself, the ghost image often remains in the photographing screen, even in a case that the image of the light source itself is outside of the photographing screen. Therefore, by performing the reflectivity-reducing treatment on such lens surfaces that satisfy the conditions (1) and (1A), the ghost image is reduced.

Within ranges of the condition (1), in a range of $$1.0 < r_i/r_{i+1} < 2.0,$$

the ghost image is generated in a fairly neighbourhood of the image of the light source itself. As mentioned above, in case of a strong light source existing in the screen, the ghost image is tolerated easily, so that it is often not a substantial problem in such case. Therefore, for example as in (f), if performing the reflectivity-reducing treatment on lens surfaces which satisfy the condition (1A), it is possible to reduce the ghost image more efficiently, without spending useless cost by the reflectivity-reducing treatment on lens surfaces where there is a high possibility that the ghost image is not substantially a problem.

For example, in case of the zoom lens unit according to (e), for example by performing the reflectivity-reducing treatment (multi-coating or subwavelength structure, for example) on the lens surface $S_i$ such that within the range of wavelength 450-550 nm, the reflectivity is 0.3% or less than 0.3%, and performing the reflectivity-reducing treatment on the lens surface $S_{i+1}$ such that within the range of wavelength 550-650 nm, the reflectivity is 0.3% or less than 0.3%, as a product of the reflectivities of the lens surfaces $S_i$ and $S_{i+1}$, the reflectivity in the range of wavelength 450-650 nm can be reduced sufficiently.

Easiness of tolerance of the ghost image depends on the color of the ghost image as well. For example, a blue ghost image and a yellow ghost image on the short wavelength side are relatively not obvious, so that they are easy to be tolerated, while a red ghost image is obvious and therefore it is hard to be tolerated.

For example in case of the zoom lens unit according to (f), for example, the desired continuous wavelength range is the wavelength range of wavelength 550-650 nm, within this wavelength range, with respect to the perpendicular incident light flux, if the reflectivity-reducing treatment is performed on each lens surface of pairs of lens surfaces such that the reflectivity is equal to or less than 0.3%, it is possible to inhibit the red ghost image effectively, and reduce the ghost image to a level that can be tolerated as a whole. In this case, if each lens surface of the pairs of lens surfaces is made to satisfy the condition (2), an overall reflectivity can further be reduced, and a greater effect of inhibiting the generation of the ghost image can be achieved.

In the lens construction according to the present invention, the first lens group including three lenses in order from the object side: a negative lens L1 having a large curvature surface on the image side; a positive meniscus lens L2 having a convex surface on the object side; and a positive lens L3 having a convex surface on the object side, which is suitable for aberration correction. In this case, when considering that a surface on the image side of the positive meniscus lens L2 corresponds to the lens surface $S_i$, and a surface on the object side of the positive lens L3 corresponds to the lens surface $S_{i+1}$ respectively, there is a high possibility that these lens surfaces form a pair of lens surfaces which satisfy the condition (1) or (1A).

Moreover, in the lens construction according to the present invention, it is suitable for aberration correction when a surface nearest to the image side of the first lens group is a concave surface, and a surface nearest to the object side of the second lens group is a convex surface. In this case, when considering that the surface nearest to the image side of the first lens group corresponds to the lens surface $S_i$, and the surface nearest to the object side of the second lens group corresponds to the lens surface $S_{i+1}$ there is a high possibility that these lens surfaces form a pair of lens surfaces which satisfy the condition (1) or (1A). Therefore, in the zoom lens unit for example according to (h) and (i), the reflectivity-reducing treatment is performed on these lens surfaces.

For example, in the zoom lens unit described in (j), the subsequent lens group arranged subsequently to the first lens group and the second lens group is a structure that includes the third lens group having a positive refracting power and a fourth lens group having a positive refracting power, and when changing the magnification from the wide angle end to the telephoto end, the first lens group and the third lens group move to the object side.

Generally, in a zoom lens unit comprising lens groups with the arrangement of positive, negative, positive, as the zoom lens unit according to the present invention, a second lens group is constructed as a so-called variator to bear a major changing magnification function, and subsequent lens groups following the third lens group share the changing magnification function as well to reduce the burden of the second lens group. Accordingly, the flexibly of aberration correction which becomes difficult by the wider field angle and larger changing magnification can be secured. In addition, when changing the magnification from the wide angle end to the telephoto end, the first lens group is significantly moved to the object side, therefore, the height of light passing the first lens group at the wide angle end can be reduced, and growth of the first lens group by the wider field angle can be controlled, and also a larger distance between the first lens group and the second lens group can be secured at the telephoto end to achieve a long focal point.

In case of the subsequent lens group for example is the one described in (j), which includes the positive third lens group and the positive fourth lens group, an enough aberration correction becomes possible by additionally satisfying the condition (3), in relation to the displacement of the first lens group which is important for the wider field angle and the long focal point.

If the parameter of the condition (3), X1/fT, becomes lower than 0.30, the contribution to the changing magnification of the second lens group decreases, and the burden of the third lens group increases, or the refracting power of the first lens group and the second lens group have to be strengthened, resulting in the deterioration in various aberrations in either case. In addition, the entire length of the lens at the wide angle end is increased in length, and the height of light passing the first lens group increases, causing the growth of the first lens group.

On the other hand, if the parameter, X1/fT becomes larger than 0.85, the entire length at the wide angle end becomes too short, or the entire length at the telephoto end becomes too long.

If the entire length at the wide angle end becomes too short, the moving space of the third lens group is limited, and the contribution to the changing magnification of the third lens group is reduced. Therefore, it becomes difficult to correct the entire aberrations. If the entire length at the telephoto end becomes too long, not only the reduction of the size in the entire length direction is disturbed, but also the radial direction grows in size for securing the light volume around at the telephoto end, and the image performance is also easily deteriorated by the manufacturing error such as the falling of lens barrel.

It is more preferable for the parameter of the condition (3), X1/fT to satisfy the following condition: (3A) 0.40<X1/fT<0.75.

In the condition (4) relating to the displacement of the third lens group, if the parameter, X3/fT becomes lower than 0.15, the contribution to the changing magnification of the third lens group is reduced, and the burden of the second lens group is increased, or the refracting power of the third lens group has to be strengthened, resulting in the deterioration in various aberrations in either case.

On the other hand, if the parameter, X3/fT becomes larger than 0.50, the entire length of lens at the wide angle end is increased in length, and the height of light passing the first lens group increases, causing the growth of the first lens group.

It is more preferable for the parameter of the condition (4), X3/fT to satisfy the following condition: (4A) 0.20<X3/fT<0.45.

If the parameter of the condition (5), $Y'_{max}/f_W$ becomes lower than 0.70, when the zoom lens unit is used for a photographing device, an enough wide field angle can not be obtained in a state that the distortion aberration at the wide angle end is corrected above a certain level. If $Y'_{max}/f_W$ becomes larger than 1.00, it is undesirable since that it is difficult to secure the image performance in the neighbouring part and the lens increases in size.

The zoom lenses for example according to (j) and (k), are preferable to satisfy the following conditions further, for their aberration corrections.

$$0.6 < |f2|/f3 < 1.0 \quad (6)$$

$$6.0 < f1/fW < 12.0 \quad (7)$$

where, f1 is a focal length of the first lens group, f2 is a focal length of the second lens group, f3 is a focal length of the third lens group, and fW is a focal length of the entire system at the wide angle end.

If the parameter of the condition (6), |f2|/f3 becomes lower than 0.6, the refracting power of the second lens group becomes too strong, on the other hand, if the parameter, |f2|/f3 becomes larger than 1.0, the refracting power of the third lens group becomes too strong. Therefore, the aberration fluctuation when changing the magnification increases easily.

If the parameter of the condition (7), f1/fW becomes lower than 6.0, it is advantageous to the larger changing magnification because the imaging magnification of the second lens group comes close to the same magnification, and the changing magnification efficiency increases. However, the large refracting power is required for each lens in the first lens group, and the negative effect such as the deterioration in the chromatic aberration especially at the telephoto end is easily produced. In addition, each lens in the first lens group is increased in the thickness and diameter, and it is disadvantageous to the reduction of the size in a collapsed state.

If the parameter of the condition (7), f1/fW becomes larger than 12.0, the contribution to the changing magnification of the second lens group is reduced, and it becomes difficult to obtain the larger changing magnification.

In the zoom lens unit according to the present invention, the aperture stop disposed between the second and the third lens groups may be moved independently of the neighboring lens groups. With this structure, the most suitable light path may be selected in any position of the large changing magnification area of 4.5 times or more. Accordingly, the flexibility of corrections such as, especially, coma aberration and field curvature may be improved, and also the off-axis performance may be improved.

It is preferable for the distance between the aperture stop and the third lens group to be wider at the wide angle end than at the telephoto end. By widening the distance between the aperture stop and the third lens group at the wide angle end, the aperture stop may be moved nearer to the first lens group and the height of light passing the first lens group may be decreased, therefore, the size of the first lens group may be further reduced.

In this case, it is preferable for the position of the aperture stop to satisfy the following condition: (8) 0.08<dsw/fT<0.20.

Where, dsw is an axial distance between the aperture stop and a lens surface nearest to the object side of the third lens group, at the wide angle end.

If the parameter of the condition (8), dsw/fT becomes smaller than 0.08, the height of light passing the first lens group becomes too big at the wide angle end, causing the growth of the first lens group. Also, it becomes disadvantageous with regard to the ensuring of off-axis performance because the aberration in the changing magnification area is hardly balanced.

If the parameter, dsw/fT becomes larger than 0.20, the height of light passing the third lens group at the wide angle end becomes too big. Thereby, the image plane falls to the over side, and the barrel shaped distortion increase. Especially, it becomes difficult to secure the performance at the wide field angle.

It is preferable for the distance between the aperture stop and the third lens group to be the widest at the wide angle end and to be the narrowest at the telephoto end. If the distance between the aperture stop and the third lens group becomes to be the widest except at the wide angle end, it becomes difficult to balance the off-axis aberration in the entire changing magnification area because the height of light passing the third lens group becomes to be the largest at the position. In addition, if the distance between the aperture stop and the third lens group becomes to be the narrowest except at the telephoto end, the distance between the second lens group and the third lens group may not be sufficiently reduced at the telephoto end. Thereby, it becomes difficult to correct the entire aberration because the contribution to the changing magnification of the third lens group is lowered.

The fourth lens group may be moved nearer to the image side at the telephoto end than at the wide angle end. Due to such movement, the luminous flux passes the neighbouring portion of the fourth lens group at the telephoto end than at the wide angle end. Accordingly, the flexibility of new design may be obtained by the different effect of the aspheric surface between the wide angle end and the telephoto end. In addition, when changing the magnification from the wide angle end to the telephoto end, the magnification of the fourth lens group increases, and the fourth lens group may share the changing magnification function. Therefore, the magnification may be effectively changed in a limited space.

Additionally, satisfying the following condition (9) enables higher aberration correction under the achievement of the target wider field angle and larger changing magnification.

$$0.60 < m4T < 0.85 \quad (9)$$

where, m4T is an imaging magnification of the fourth lens group at the telephoto end.

If m4T is smaller than 0.60, the luminous flux emitting to the third lens group approaches afocal, and it is impossible for the third lens group to change the magnification effectively, and as a result, the share of changing magnification of the second lens group increases, and also it becomes difficult to correct the field curvature and astigmatism which increase with the wider field angle.

On the other hand, if m4T is larger than 0.85, a required back-focus may not be secured, or the refracting power of the fourth lens group becomes too small, because the fourth lens group is too close to the image side. If the refracting power of the fourth lens group becomes too small, the exit pupil approaches the image plane and the light incidence angle to the neighboring portion of the image increases. Therefore, the shortage of light volume in the neighboring portion is easily caused.

It is more preferable for the parameter, m4T to satisfy the following condition.

$$0.65 < m4T < 0.80. \quad (9A)$$

Further, it is preferable for the change in the magnification of the fourth lens group when changing the magnification from the wide angle end to the telephoto end, to satisfy the following condition (10).

$$1.0 < m4T/m4W < 1.3 \quad (10)$$

where, m4W is an imaging magnification of the fourth lens group at the wide angle end.

If the parameter of the condition (10), m4T/m4W is smaller than 1.0, the fourth lens group does not contribute to the changing magnification. Thereby, the share of changing magnification of the second and the third lens groups increases. Accordingly, it becomes difficult to balance the image plane when changing the magnification. On the other hand, if the parameter, m4T/m4W is larger than 1.3, it becomes difficult to correct the aberration with the simple structure of the fourth lens group comprising one positive lens because the share of changing magnification of the fourth lens group becomes too big.

It is more preferable for the parameter, m4T/m4W to satisfy the following condition:

$$1.05 < m4T/m4W < 1.2. \quad (10A)$$

In the zoom lens unit for example according to (j), in case of the fourth lens group comprising one positive lens, it is preferable for its Abbe number, $v_4$, to satisfy the condition:

$$50 < v_4 < 75. \quad (11)$$

If $v_4$ is smaller than 50, the chromatic aberration, which is generated in the fourth lens group, becomes too big. Therefore, it becomes difficult to balance the axial chromatic aberration and magnification chromatic aberration over the entire zooming area. In addition, when focusing to a finite distance object by moving the fourth lens group, the fluctuation of chromatic aberration by the focusing increases. If $v_4$ is larger than 75, it is advantageous to the correction of chromatic aberration, but the material is expensive and also it is difficult to process both surfaces as an aspheric surface. It is more preferable for the Abbe number, $v_4$ to satisfy the condition:

$$50 < v_4 < 65. \quad (11A)$$

The positive lens constituting the fourth lens group may be made of plastic. The plastic material, which satisfies the above condition (11) or (11A) relating to the Abbe number, includes polyolefin series resin, which is represented by ZEONEX (trade name) of ZEON Corporation, Japan, for example.

Hereinafter, explanations will be given for conditions which enable more preferable aberration correction without disturbing the reduction of the size of the zoom lens unit of the present invention.

It is preferable for the second lens group to include three lenses, arranged in order from the object side: a negative lens having a large curvature surface on the image side, a positive lens having a large curvature surface on the image side, and a negative lens having a large curvature surface on the object side.

As a changing magnification group having a negative refracting power, there has been well known an arrangement having a negative lens, negative lens and positive lens in order from the object side when the changing magnification group comprises three lenses. However, compared with this structure, the above mentioned structure having the negative lens, positive lens and negative lens is superior to the correction performance of the chromatic aberration of magnification with the wider field angle.

In this case, the second lens and the third lens in order from the object side may be cemented appropriately.

It is preferable for each lens of the second lens group which is constructed by three lenses with the arrangement of negative lens, negative lens and positive lens as mentioned above, to satisfy the following conditions.

$$1.75 < N_{21} < 1.90, 35 < v_{21} < 50$$

$$1.65 < N_{22} < 1.90, 20 < v_{22} < 35$$

$$1.75 < N_{23} < 1.90, 35 < v_{23} < 50.$$

Where, $N_{2i}$, $v_{2i}$ (i=1 to 3) represent a refractive index and Abbe number of a lens i counted from the object side in the second lens group, respectively.

If such a glass type is selected, the chromatic aberration may be corrected more preferably.

It is preferable for the first lens group to have at least one negative lens and at least one positive lens from the object side. More particularly, it is preferable for the first lens group to comprises two lenses, arranged in order from the object side: a negative meniscus lens having a convex surface on the object side and a positive lens having a strong convex surface on the object side, or it is preferable for the first lens group to comprise three lenses, arranged in order from the object side: a negative meniscus lens having a convex surface on the object side, a positive lens having a strong convex surface on the object side and a positive lens having a strong convex surface on the object side.

It is preferable for the third lens group to comprise three lenses, arranged in order from the object side, a positive lens, a positive lens and a negative lens, and the second lens and the third lens from the object side may be cemented appropriately.

When focusing to a finite distance, a method, which moves only the fourth lens group, is preferable because a weight of object to be moved is minimum. The displacement of the fourth lens group is small when changing the magnification, and there is also a merit that the moving mechanism for the changing magnification and the moving mechanism for the focusing may be used combinedly.

In order to advance the reduction of the size while maintaining preferable aberration correction, it may be necessary to adopt an aspheric surface. It is preferable for at least the second lens group and the third lens group to have one aspheric surface or more, respectively. Especially in the second lens group, if both of the surface nearest to the object side and the surface nearest to the image side are aspheric surfaces, high effect for the corrections of the distortion aberration, the astigmatism and the like which increase with the wider field angle, may be obtained.

As the aspheric surface lens, molded optical glass and molded optical plastic (glass could aspheric surface and plastic could aspheric lens), an aspheric surface that a thin resin layer is molded on a glass lens (i.e., hybrid aspheric surface and replica aspheric surface) and the like may be used.

In order to simplify the mechanism, it is better for the opening diameter of the aperture stop to be constant regardless of the changing magnification. However, the change in F number with the changing magnification may be reduced by increasing the opening diameter at the long focal point end with respect to the short focal point end. In addition, if it is necessary to reduce the light volume which reaches the image plane, the diameter of aperture stop may be reduced. However, it is preferable to insert an ND filter and the like without significantly changing the diameter of aperture stop so as to reduce the light volume because the resolution deteriorated by a diffraction phenomenon may be prevented.

As described above, according to the present invention, it is possible to provide a zoom lens unit which may effectively inhibit the ghost image caused by the reflection between lens surface to lens surface in the first and the second lens groups located nearer to the object side than the aperture stop. The zoom lens unit may achieve the changing magnification ratio of about 4.5 times or more (6.5 times or more in the embodiment), and the half field angle at the wide angle edge of 38 degrees or more, with reducing the ghost image effectively.

Therefore, by using the zoom lens unit according to the present invention, an imaging device and a photographing device with a high performance may be achieved.

BRIEF DESCRIPTION OF THE DRAWINGS

The invention will be described further below with reference to exemplary embodiment and the accompanying schematic drawings, in which.

DETAILED DESCRIPTION OF THE PREFERRED EMBODIMENTS

An embodiment of a photographing device will be described with reference to FIGS. 11A to 11 and 12. In this embodiment, the photographing device is a mobile information terminal, although it is not limited thereto.

Figure 11A:
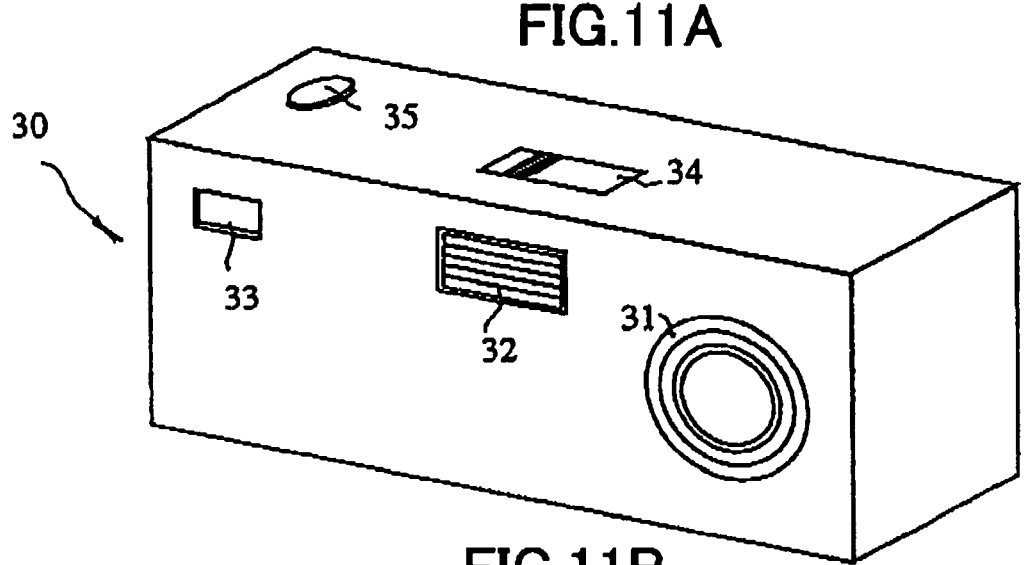
FIGS. 11A to 11C are figures explaining an embodiment of a photographing device.
Figure 11B:
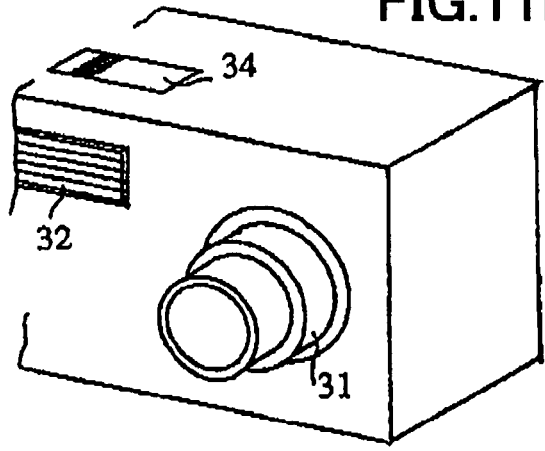
Figure 11C:
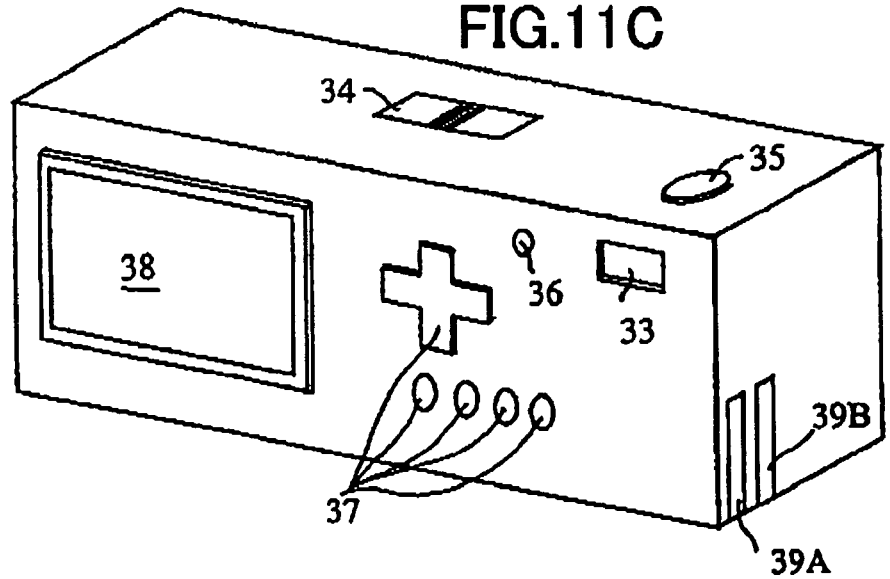
Figure 12:
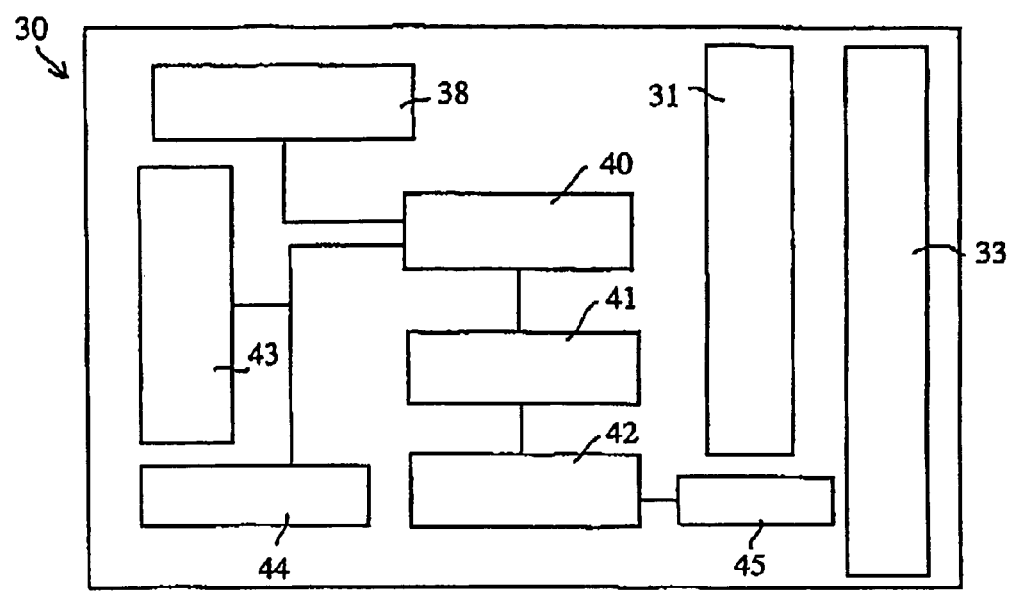
FIG. 12 is a figure explaining a system of the photographing device illustrated in FIGS. 11A to 11C.

As illustrated in FIGS. 11A to 11 and 12, a mobile information terminal 30 includes a photographing lens 31 and an area-type light receiving element (area sensor) 45 which is an imaging element. In the mobile information terminal 30, an image of a photographic object by the photographing lens 31 is imaged onto the light receiving element 45, and the image is read out by the light receiving element 45.

As the photographing lens 31, for example, any one of the zoom lenses described in (a)-(m), more particularly, a zoom lens unit described in the after-mentioned embodiment is used, for example. In addition, as the light receiving element 45, a light receiving element having 5 million to 8 million pixels or more, for example, a CCD (Charge-Coupled Device) area sensor having the opposite angle length of light receiving area, 9.1 mm, the pixel pitch, 2.35 μm, and about 7 million pixels, and a CCD area sensor having the opposite angle length of light receiving area, 9.1 mm, the pixel pitch, 2 μm, and about 10 million pixels may be used.

As illustrated in FIG. 12, the output from the light receiving element 46 is processed by a signal processing device 42 which receives control of a central processing unit 40, to be converted into the digital information. The image information digitised by the signal processing device 42 is recorded in a semiconductor memory 44 after receiving a predetermined image processing in an image processing device 41, which receives the control of the central processing unit 40. A liquid crystal monitor 38 may display an image during photographing and also an image recorded in the semiconductor memory 44. Moreover, the image recorded in the semiconductor memory 44 may be exported by using a communication card 43, etc.

As illustrated in FIG. 11A, the photographing lens 31 is in a collapsed state while the device is being carried. If a user operates a power source switch 36 to turn on the power, as illustrated in FIG. 11B, the lens barrel is extended. In this case, in the interior of the lens barrel, each group of the zoom lens unit is in, for example, the arrangement of short focus end, and the arrangement of each group may be changed by operating a zoom lever 34; thus, the magnification may be changed to the long focus end. In this case, a magnification of a finder 33 is changed in conjunction with the change in field angle of the photographing lens 31. Meanwhile an electric flash 32 is mounted on the mobile information terminal 30.

The focusing is performed by half-pressing a shutter button 35. When using the zoom lens unit described in the later-described embodiment, the focusing may be performed by moving the second lens group or the fourth lens group, or by moving the light receiving element 45. The photographing is performed by further pressing the shutter button 35, and then the above processes are conducted.

When displaying the image recorded in the semiconductor memory 44 on the liquid crystal monitor 38, and when exporting the image by using the communication card 43, etc., operation buttons 37 are used. The semiconductor memory 44, the communication card 43, etc., may be inserted into the exclusive-use or general-purpose slots 39A, 39B respectively.

In addition, when the photographing lens 31 is in a collapsed state, each group of the zoom lens unit is not always necessary to be lined on the optical axis. For example, if the zoom lens unit has a structure that the third lens group is retracted from the optical axis to be stored in parallel with other lens groups, the information device may be further slimmed.

The zoom lens unit to be described in the later embodiment is possible to be used as the photographing lens 31 in the above described mobile information terminal. Accordingly, a small and high quality mobile information terminal, using a light receiving element having 5 million to 8 million pixels or more may be achieved.

Hereinafter an embodiment of a zoom lens unit according to the present invention will be described. The maximum image height in the embodiment is 3.70 mm. In the embodiment, a parallel plate arranged in an image plane side of a fourth lens group may be various filters such as an optical lowpass filter and infrared protection filter, and a cover glass (seal glass) of light receiving element such as a CCD sensor.

In the embodiment, aberrations are sufficiently corrected, and the lenses may be applied to a light receiving element having 5 million to 8 million pixels or more. It is obvious from the embodiment that the zoom lens unit according to the present invention may ensure a remarkably excellent image performance while achieving a sufficient miniaturization.

Meanings of signs in the embodiment are as follows:
f: focal length of entire system
F: F-number
ω: half field angle
R: curvature radius
D: surface distance
$N_d$: refractive index
$v_d$: Abbe number
K: cone constant of aspheric surface
$A_4$: $4^{th}$ aspheric surface coefficient
$A_6$: $6^{th}$ aspheric surface coefficient
$A_8$: $8^{th}$ aspheric surface coefficient
$A_{10}$: $10^{th}$ aspheric surface coefficient
$A_{12}$: $12^{th}$ aspheric surface coefficient
$A_{14}$: $14^{th}$ aspheric surface coefficient
$A_{16}$: $16^{th}$ aspheric surface coefficient
$A_{18}$: $18^{th}$ aspheric surface coefficient The aspheric surface shape may be expressed by the following equation, using an inverse number of paraxial curvature radius (paraxial curvature), C, a height from an optical axis, H, a cone constant number, K, and an aspheric surface coefficient of each of the above degrees, and adopting an aspheric surface amount in the optical axis direction as X.

$$X = CH^2 / \{1 + \sqrt{(1 \cdot (1+K)C^2 H^2)}\} + A_4 \cdot H^4 + A_6 \cdot H^6 + A_8 \cdot H^8 + A_{10} \cdot H^{10} + A_{12} \cdot H^{12} + A_{14} \cdot H^{14} + A_{16} \cdot H^{16} + A_{18} \cdot H^{18}$$

EMBODIMENT
f = 4.74~31.88, F = 3.49~5.02, ω = 39.20~6.50

| Surface No. | R | D | $N_d$ | $v_d$ | Remarks |
|---|---|---|---|---|---|
| 01 | 35.951 | 1.00 | 1.84666 | 23.78 | First Lens |
| 02 | 22.834 | 3.44 | 1.49700 | 81.54 | Second Lens |
| 03 | 92.407 | 0.10 | | | |
| 04 | 26.507 | 2.58 | 1.80400 | 46.57 | Third Lens |
| 05 | 79.541 | Variable(A) | | | |
| *06 | 37.724 | 0.84 | 1.80400 | 46.57 | Fourth Lens |
| 07 | 4.355 | 2.31 | | | |
| 08 | 48.799 | 2.51 | 1.76182 | 26.52 | Fifth Lens |
| 09 | −6.568 | 0.74 | 1.83481 | 42.71 | Sixth Lens |
| *10 | −96.317 | Variable(B) | | | |
| 11 | Aperture Stop | Variable(C) | | | |
| *12 | 7.796 | 2.85 | 1.58913 | 61.15 | Seventh Lens |
| *13 | −10.195 | 0.10 | | | |
| 14 | 11.746 | 2.16 | 1.77250 | 49.60 | Eighth Lens |

-continued

EMBODIMENT
f = 4.74~31.88, F = 3.49~5.02, ω = 39.20~6.50

| Surface No. | R | D | $N_d$ | $v_d$ | Remarks |
|---|---|---|---|---|---|
| 15 | −8.479 | 0.80 | 1.71736 | 29.52 | Ninth Lens |
| 16 | 4.849 | Variable(D) | | | |
| *17 | 13.600 | 2.28 | 1.52470 | 56.20 | Tenth Lens |
| *18 | −29.129 | Variable(E) | | | |
| 19 | ∞ | 0.80 | 1.51680 | 64.20 | Various Filters |
| 20 | ∞ | | | | |

Aspheric Surface (attached with a sign of asterisk "*")
Aspheric Surface: Sixth Surface
K=0.0,
$A_4$=8.99680×10$^{-5}$, $A_6$=1.17385×10$^{-5}$,
$A_8$=−2.28174×10$^{-6}$, $A_{10}$=1.61797×10$^{-7}$,
$A_{12}$=−4.87869×10$^{-9}$, $A_{14}$=2.49023×10$^{-11}$,
$A_{16}$=1.66865×10$^{-12}$, $A_{18}$=−2.55153×10$^{-14}$,
Aspheric Surface: Tenth Surface
K=0.0,
$A_4$=−4.17819×10$^{-4}$, $A_6$=×1.85516×10$^{-5}$,
$A_8$=1.73536×10$^{-6}$, $A_{10}$=−1.09898×10$^{-7}$
Aspheric Surface: Twelfth Surface
K=0.0,
$A_4$=−6.52161×10$^{-4}$, $A_6$=−1.64731×10$^{-5}$,
$A_8$=5.08316×10$^{-6}$, $A_{10}$=−4.47602×10$^{-7}$
Aspheric Surface: Thirteenth Surface
K=0.0,
$A_4$=3.04932×10$^{-4}$, $A_6$=−1.84286×10$^{-5}$,
$A_8$=3.75632×10$^{-6}$, $A_{10}$=−2.69027×10$^{-7}$
Aspheric Surface: Seventeenth Surface
K=0.0,
$A_4$=6.36181×10$^{-5}$, $A_6$=2.03691×10$^{-5}$,
$A_8$=−3.14875×10$^{-7}$, $A_{10}$=7.89983×10$^{-9}$
Aspheric Surface: Eighteenth Surface
K=0.0,
$A_4$=2.63195×10$^{-4}$, $A_6$=−4.01829×10$^{-5}$.

| | Variable Distance | | |
|---|---|---|---|
| | Short focus end | Intermediate focal length | Long focus end |
| f | 4.740 | 12.313 | 31.883 |
| A | 0.600 | 10.861 | 21.200 |
| B | 7.955 | 3.420 | 1.150 |
| C | 3.400 | 2.374 | 0.750 |
| D | 2.745 | 9.291 | 13.554 |
| E | 3.693 | 2.706 | 2.285 |

Values of parameters in each condition $X1/fT$=0.646

$X3/fT$=0.297

$|f2|/f3$=0.733

$f1/fW$=9.07

$dsw/fT$=0.107

$m4T$=0.742

$m4T/m4W$=1.118

| i | $r_i/r_{i+1}$ | |
|---|---|---|
| 1 | 1.57 | |
| 2 | 0.25 | |
| 3 | 3.49 | Multi Coating |
| 4 | 0.33 | Multi Coating |
| 5 | 2.11 | Multi Coating |
| 6 | 8.66 | Multi Coating |
| 7 | 0.09 | |
| 8 | −7.43 | |
| 9 | 0.07 | |
| 10 | | |

Figure 1:
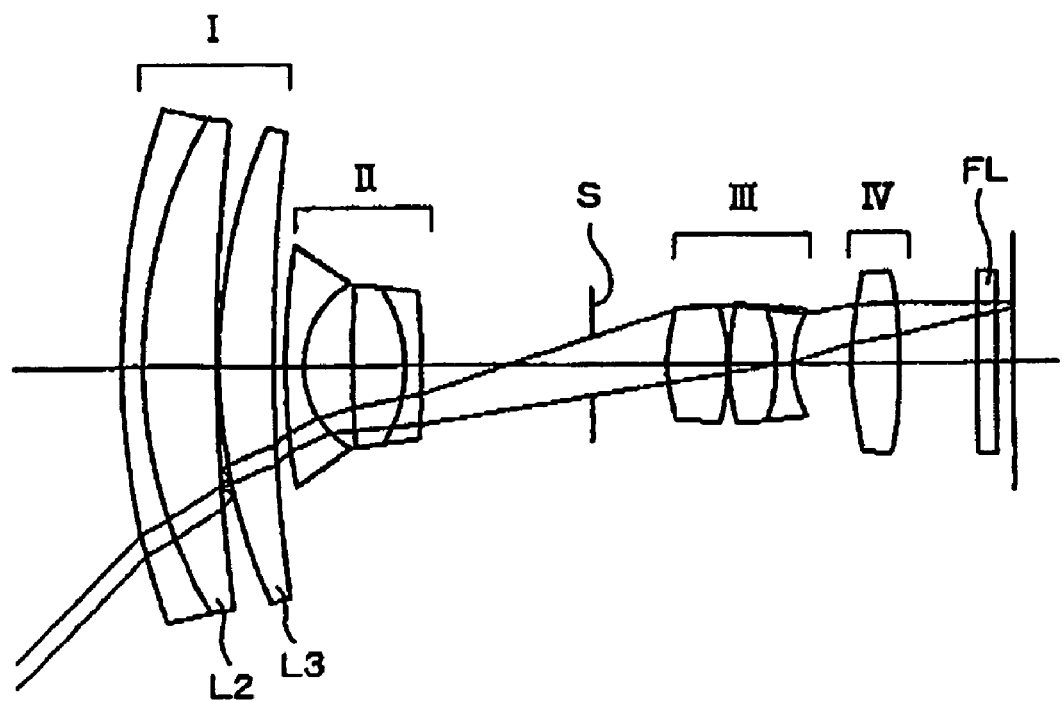
FIG. 1 is a figure illustrating an example of an optical path of a ghost light generated in a zoom lens unit according to an embodiment of the invention.

FIG. 1 illustrates that in the short focus end of a zoom lens unit according to the embodiment, a ray of light from a light source which is set at 45 degrees to an optical axis (approximately at infinity) is reflected by two lens surfaces, and reaches an image plane to form a ghost image. In the figure, a reference sign I denotes a first lens group, II denotes a second lens group, III denotes a third lens group, IV denotes a forth lens group, and a reference code S denotes an aperture stop. In addition, parallel plate represented by FL may be various filters such an an optical lowpass filter and infrared protection filter, and a cover glass (seal glass) of light receiving element such as a CCD sensor, and the equivalent.

The ghost light which forms the ghost image is reflected by an object side surface of the positive lens L3 in the first lens group, and is gain by an image side surface of the positive lens L2.

Here, when considering that the image side surface of the positive lens L2 corresponds to the lens surface $S_i$, the object side surface of the positive lens L3 corresponds to the lens surface $S_{i+1}$, a result is $r_i/r_{i+1}$=3.49 and satisfies the conditions (1) and (1A).

Figure 2:
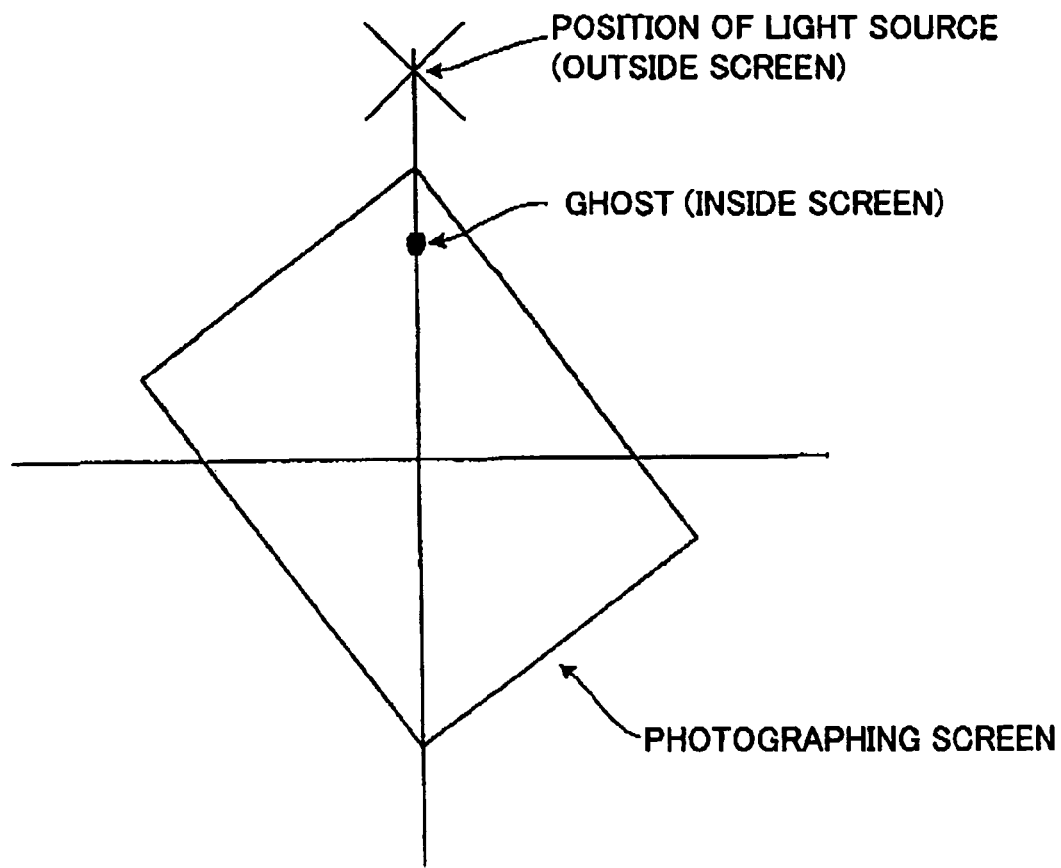
FIG. 2 is a spot diagram of a ghost image caused by the light illustrated in FIG. 1.

FIG. 2 is a spot diagram in the image plane of the ghost light in the case illustrating in FIG. 1, and a rectangular frame line illustrates a photographing screen of a case that the source of light is in a direction of the opposite angle. A half field angle in the short focus end (in the direction of the opposite angle) of the zoom lens unit described in this embodiment is about 39 degrees, and an image of the source of light which is at 45 degrees to the optical axis (a position of the source of light in the figure) is outside of the screen.

However, the ghost image ("Ghost" in the figure) due to the ghost lights enter into the photographing screen, and is bright and distinguished because the ghost lights are converged. It is difficult to eliminate the ghost image out of the photographing screen, even in case of changing configuration parameters of the lens in the range where the aberration correction works out. Therefore, for controlling the ghost image, in the embodiment, as mentioned above, a multi-coating (having spectral reflectivity characteristics illustrated in FIG. 5 or FIG. 6) is performed as the reflectivity-reducing treatment, both on the image side surface of the positive lens L2 (the lens surface $S_3$) and the object side surface of the positive lens L3 (the lens surface $S_4$) which form a pair of lens surfaces satisfy the conditions (1) and (1A).

Figure 5:
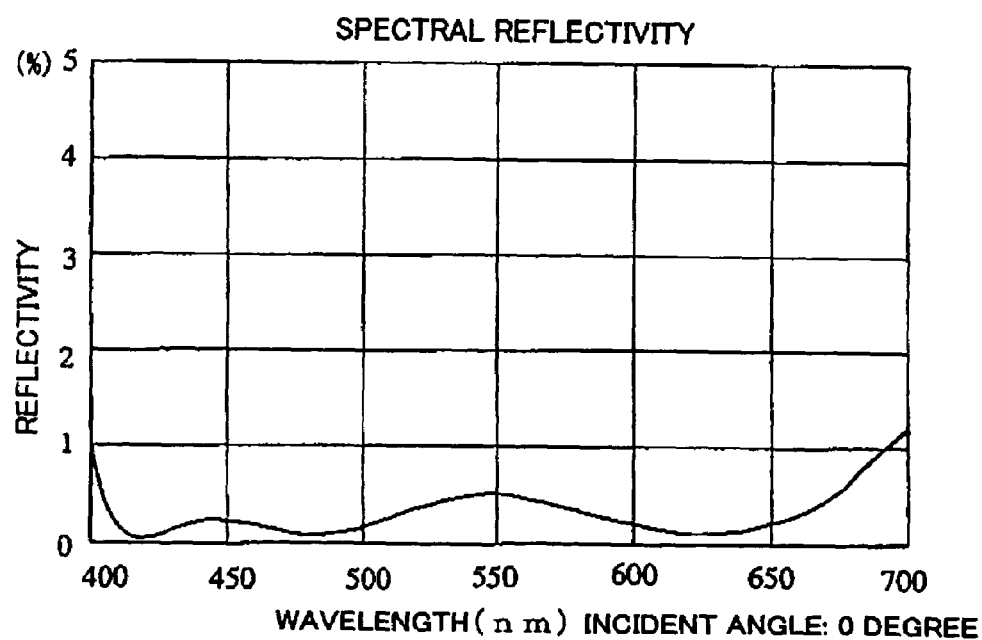
FIG. 5 is a figure illustrating an example of spectral reflectivity applied to lens surfaces $S_i$, $S_{i+1}$.
Figure 6:
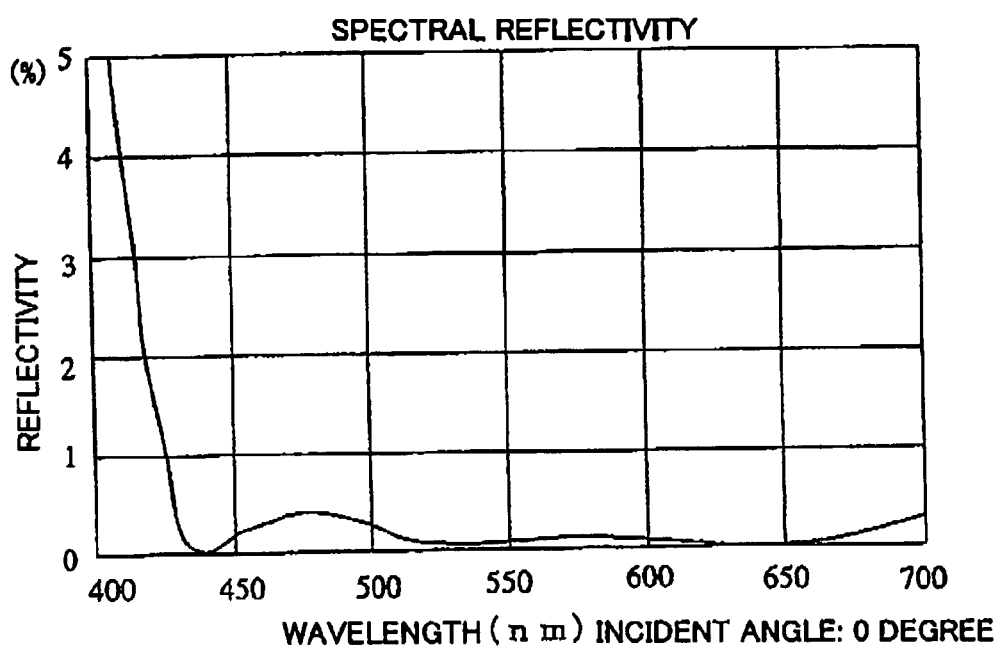
FIG. 6 is a figure illustrating another example of spectral reflectivity applied to lens surfaces $S_i$, $S_{i+1}$.

The purpose of the multi-coating is to reduce the reflectivity, therefore the measures other than the multi-coating, such as subwavelength structure etc. which can reduce the reflectivity may be used, as long as for example, spectral reflectivity characteristics illustrated in FIG. 5 or FIG. 6 may be consequently obtained on these lens surface. FIGS. 5 and 6 illustrate the spectral reflectivity due to the multi-coating, and the lens surfaces are film designed and formed to satisfy the condition (2).

An explanation about another lens surface will be given hereinafter.

Figure 3:
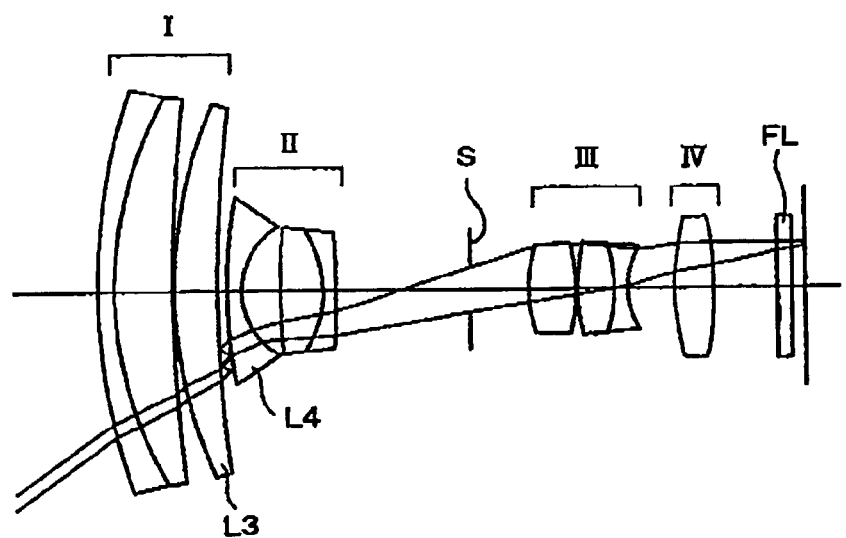
FIG. 3 is a figure illustrating another example of an optical path of a ghost light generated in the zoom lens unit according to the embodiment of the invention.

FIG. 3 illustrates that in the short focus end of the zoom lens unit according to the embodiment, a ray of light from a source of light which is at 35 degrees to the optical axis (approximately at infinity) is reflected by two lens surfaces and reaches an image plane as a ghost light to form a ghost image. The ghost light is reflected by an object side surface of a positive lens L4 of the second lens group II (the surface nearest to the object side in the second lens group, lens surface $S_6$), and reflected again by the image side surface of the positive lens L3 (lens surface $S_5$) which is the surface nearest to the image side in the first lens group I.

Here, when considering that the image side surface of the positive lens L3 corresponds to the lens surface $S_i$ (i=5), the object side surface of the positive lens L4 corresponds to the lens surface $S_{i+1}$ (i=6), a result is $r_i/r_{i+1}$=2.11 and satisfies the conditions (1) and (1A).

Figure 4:
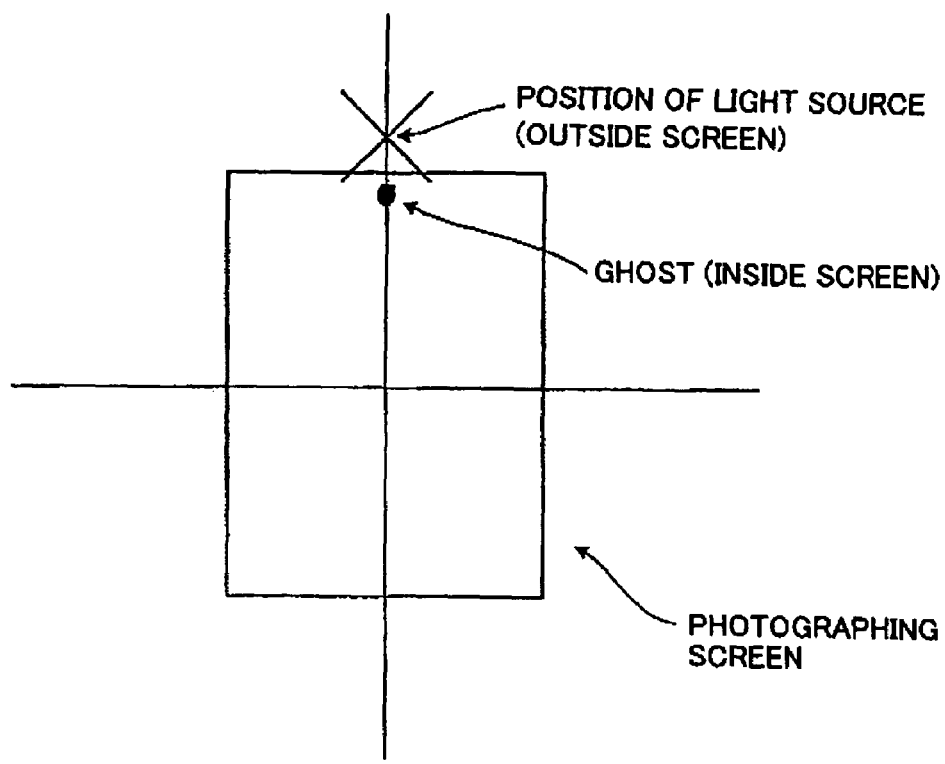
FIG. 4 is a spot diagram of a ghost image caused by the light illustrated in FIG. 2.

FIG. 4 is a spot diagram in the image plane of the ghost light of the case illustrating in FIG. 3, and a rectangular frame line illustrates a photographing screen of a case that the source of light is on a symmetric axis in a long side direction of the photographing screen. In the short focus end of the zoom lens unit according to the embodiment, a half field angle in the long side direction of the photographing screen is about 32 degrees, and an image of the source of light which is at 35 degrees to the optical axis is outside of the screen. However, the ghost lights enter into the photographing screen and form a bright and distinguished ghost image ("Ghost" in the figure) due to convergence of the ghost lights. It is difficult to eliminate the ghost image out of the photographing screen, even in case of changing the configuration parameters of the lens within the range where the aberration correction works out.

Therefore, for controlling the ghost image, the multi coating (having the spectral reflectivity characteristics illustrated in FIG. 5 or FIG. 6) is performed as the reflectivity-reducing treatment, both on the image side surface of the positive lens L3 of the first lens group I (the lens surface $S_5$) and the object side surface of the positive lens L4 of the second lens group II (the lens surface $S_6$).

For this case as well, for example, if the spectral reflectivity characteristics illustrated in FIG. 5 or FIG. 6 may be obtained on each of these lens surfaces, the reflectivity-reducing treatment may be any other treatment other than the multi-coating.

Figure 7:
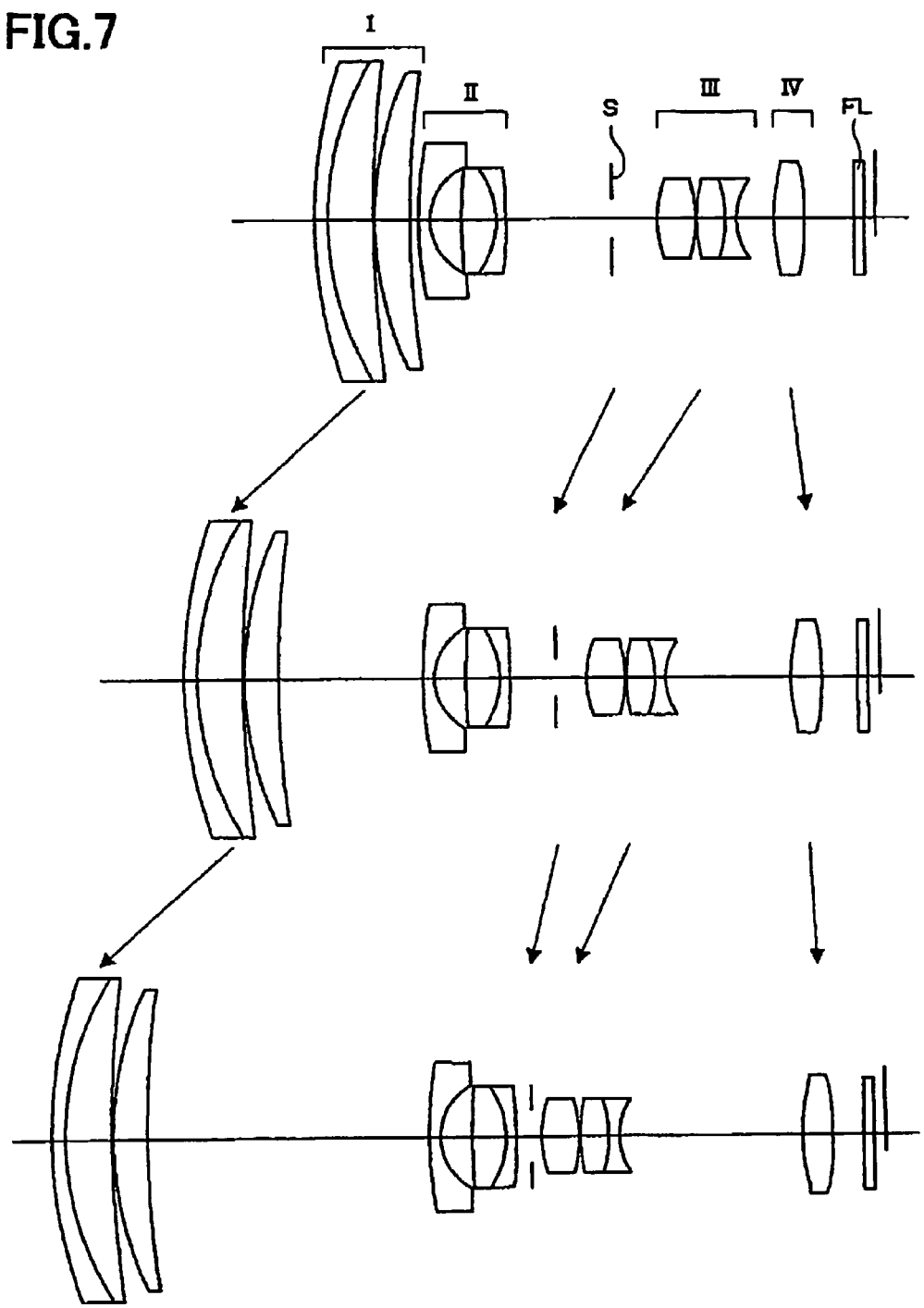
FIG. 7 is a figure illustrating a structure of the zoom lens unit according to the embodiment and displacements of each lens group with changing magnification.
Figure 8:
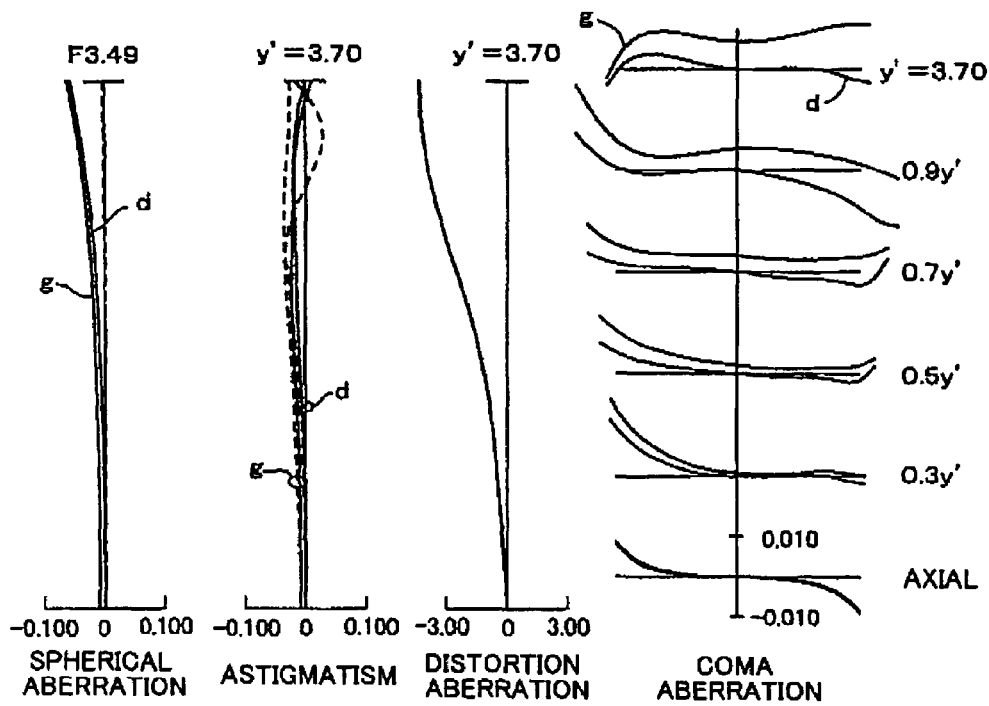
FIG. 8 is a view illustrating aberrations at a short focus end of the zoom lens unit according to the embodiment.
Figure 9:
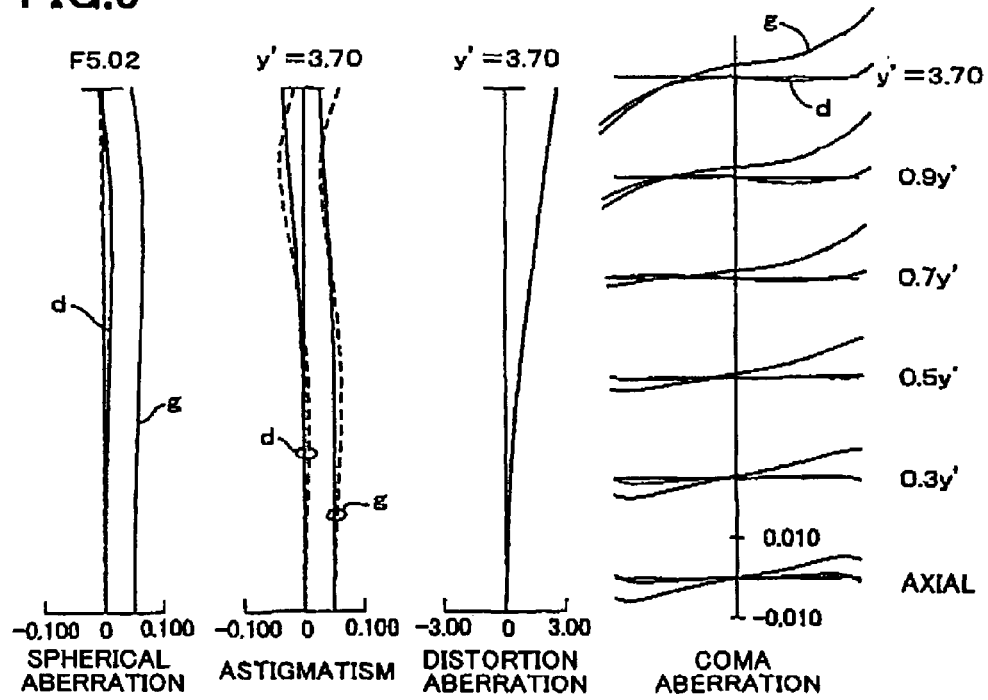
FIG. 9 is a view illustrating aberrations at an intermediate focal length of the zoom lens unit according to the embodiment.
Figure 10:
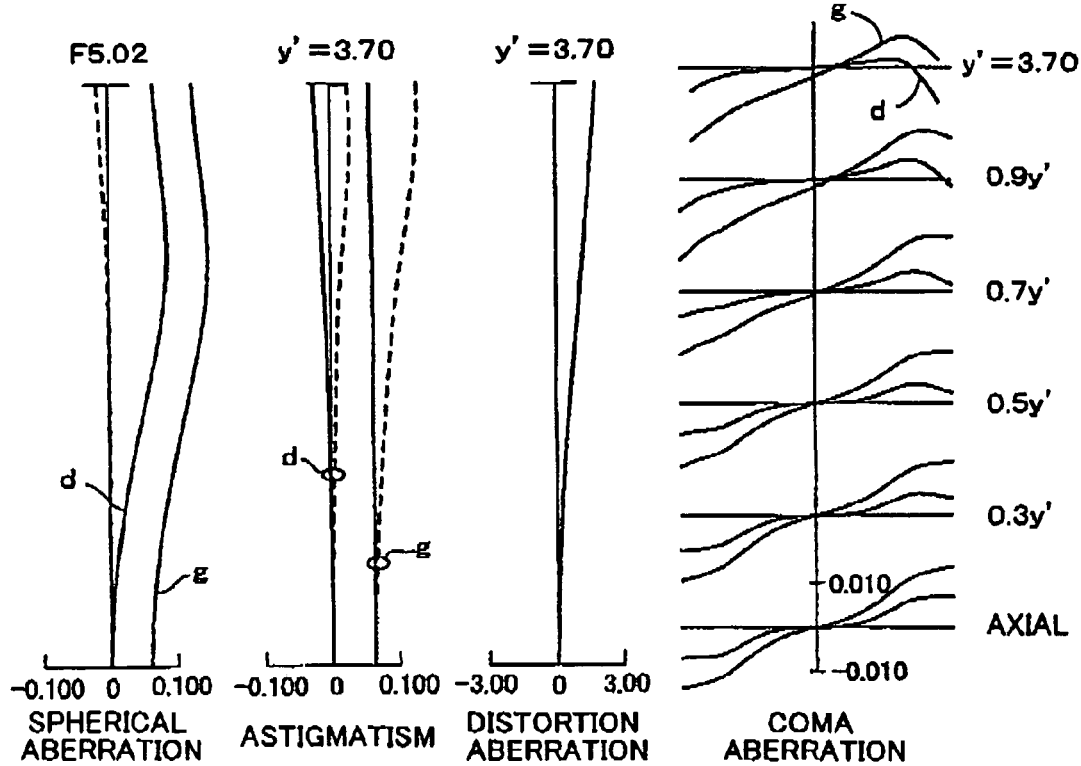
FIG. 10 is a view illustrating aberrations at a telephoto end of the zoom lens unit according to the embodiment.

FIG. 7 illustrates displacements of the lens groups I to IV and the aperture stop S in accordance with changing the magnification of the zoom lens unit in the embodiment. In FIG. 7, the upper figure illustrates a state at the wide angle end, the middle figure illustrates a state at the intermediate focal length, and the lower figure illustrates a state at the telephoto end. FIGS. 8, 9, 10 illustrate the aberration diagrams in the short focus end (wide angle end), intermediate focal length, long focus end (telephoto end) sequentially. In addition, the dashed line in the spherical aberration diagram illustrates a sine condition, the solid line in the astigmatic diagram illustrates sagittal, and the dashed line in the astigmatic diagram illustrates meridional respectively. Moreover, "d" indicates "d line", and "g" indicates "g line".

It should be noted that although the present invention has been described with respect to exemplary embodiment, the invention is not limited thereto. In view of the foregoing, it is intended that the present invention cover modifications and variations provided they fall within the scope of the following claims and their equivalent.

The entire contents of Japanese patent application No. 2005-6304445, filed on Oct. 19, 2005, of which the convention priority is claimed in this application are incorporated thereinto by reference.

What is claimed is:

1. A zoom lens unit, comprising:
   a first lens group having a positive refracting power;
   a second lens group having a negative refracting power; and
   a subsequent lens group comprising one or more lens groups and having a positive refracting power as a whole, said one or more lens groups comprising a third lens group,
   the first lens group, the second lens group and the subsequent lens group being arranged in this order from an object side to an image side,
   an aperture stop disposed between the second lens group and the third lens group,
   wherein when changing a magnification from a wide angle end to a telephoto end, a distance between the first lens group and the second lens group increases, while a distance between the second lens group and the subsequent lens group decreases,
   wherein a lens construction including the first and the second lens groups satisfies the condition:

$$1.0 < r_i/r_{i+1} < 5.0 \qquad (1),$$

in which $r_i$ and $r_{i+1}$ are curvature radii of lens surfaces $S_i$ and $S_{i+1}$ in the lens construction, respectively, the lens surfaces $S_i$ and $S_{i+1}$ being "i"th and "i+1"th lens surfaces, respectively, counted from the object side,
   and wherein a reflectivity-reducing treatment adapted to reduce intensity of a ghost image is performed on each lens surface forming at least one of pairs of lens surfaces satisfying the condition (1).

2. A zoom lens unit according to claim 1, wherein the reflectivity-reducing treatment adapted to reduce intensity of the ghost image is performed on the lens surfaces forming all the pair or pairs of lens surfaces satisfying the condition (1).

3. A zoom lens unit according to claim 1, wherein the reflectivity-reducing treatment performed on the lens surfaces gives a refractivity $R_{200}$ (unit: %): $R_{200} < 0.7$ (2) for a flux of a perpendicular incident light in a range of wavelength 450-650 nm.

4. A zoom lens unit according to claim 1,
   wherein, within a range of wavelength 450-650 nm with respect to the perpendicular incident light flux, each lens surface forming at least one of the pairs of lens surfaces satisfying the condition (1) exhibits that:
   in a wavelength range the reflectivity is equal to or less than 0.3%,
   in a wavelength range the reflectivity is more than 0.3%, and
   the reflectivity-reducing treatment on said each lens surface is performed such that the reflectivity of one or both of said lens surfaces is equal to or less than 0.3% over the range of wavelength 450-650 nm.

5. A zoom lens unit according to claim 1,
   wherein the reflectivity-reducing treatment of each lens surface is performed such that:
   in a desired continuous wavelength range within wavelength 450-650 nm, with respect to the perpendicular incident light flux, the reflectivity of each lens surface forming at least one of the pairs of lens surfaces satisfying the condition (1), is equal to or less than 0.3%.

6. A zoom lens unit according to claim 1, wherein the lens construction including the first and the second lens groups satisfies the condition:

$$2.0 < r_i/r_{i+1} < 5.0 \qquad (1A),$$

in which $r_i$ and $r_{i+1}$ are curvature radii of lens surfaces $S_i$ and $S_{i+1}$ in the lens construction, respectively, the lens surfaces $S_i$ and $S_{i+1}$ being "i"th and "i1"th lens surfaces, respectively, counted from the object side, and wherein the reflectivity-reducing treatment adapted to reduce intensity of the ghost image is performed on each lens surface forming at least one of the pairs of lens surfaces satisfying the condition (1A).

7. A zoom lens unit according to claim 6, wherein the reflectivity-reducing treatment adapted to reduce intensity of the ghost image is performed on the lens surfaces forming all the pair or pairs of lens surfaces satisfying the condition (1A).

8. A zoom lens unit according to claim 6, wherein the reflectivity-reducing treatment performed on the lens surfaces gives a refractivity $R_{200}$ (unit: %): $R_{200} < 0.7$ (2) for a flux of a perpendicular incident light in a range of wavelength 450-650 nm.

9. A zoom lens unit according to claim 6,
wherein, within a range of wavelength 450-650 nm with respect to the perpendicular incident light flux, each lens surface forming at least one of the pairs of lens surfaces satisfying the condition (1A) exhibits that:
in a wavelength range the reflectivity is equal to or less than 0.3%,
in a wavelength range the reflectivity is more than 0.3%, and
the reflectivity-reducing treatment on said lens surface is performed such that the reflectivity of one or both of said lens surfaces is equal to or less than 0.3% over the range of wavelength 450-650 nm.

10. A zoom lens unit according to claim 6,
wherein the reflectivity-reducing treatment of each lens surface is performed such that:
in a desired continuous wavelength range within wavelength 450-650 nm, with respect to the perpendicular incident light flux, the reflectivity of each lens surface forming at least one of the pairs of lens surfaces satisfying the condition (1A), is equal to or less than 0.3%.

11. A zoom lens unit according to claim 1, wherein the reflectivity-reducing treatment includes:
a multilayer film being layered on the lens surface and having a function of reducing the reflectivity.

12. A zoom lens unit according to claim 1, wherein the reflectivity-reducing treatment includes:
a subwavelength structure being formed as a surface shape of the lens surface to reduce the reflectivity.

13. A zoom lens unit according to claim 1,
wherein the first lens group includes three lenses in order from the object side:
a negative lens having a large curvature surface on the image side;
a positive meniscus lens having a convex surface on the object side; and
a positive lens having a convex surface on the object side, wherein the positive meniscus lens has the lens surface $S_i$ on the image side, the positive lens has the lens surface $S_{i+1}$ on the object side, and the lens surface $S_i$ and the lens surface $S_{i+1}$ satisfy the condition (1).

14. A zoom lens unit according to claim 1,
wherein a lens surface nearest to the image side of the first lens group is a concave surface, a lens surface nearest to the object side of the second lens group is a convex surface, and
wherein the condition (1) is satisfied, where the concave surface is the lens surface $S_i$, and the convex surface is the lens surface $S_{i+1}$.

15. A zoom lens unit according to claim 1,
wherein the subsequent lens group arranged on the image side of the aperture stop comprises the third lens group having a positive refracting power, and a fourth lens group having a positive refracting power, and when changing the magnification from the wide angle end to the telephoto end, the first lens group and the third lens group move to the object side.

16. A zoom lens unit according to claim 15, which satisfies the conditions:

$$0.30 < X1/fT < 0.85 \qquad (3),$$

$$0.15 < X3/fT < 0.50 \qquad (4),$$

in which X1 is a total displacement of the first lens group when changing the magnification from the wide angle end to the telephoto end, X3 is a total displacement of the third lens group when changing the magnification from the wide angle end to the telephoto end, and fT is a focal length of the entire system at the telephoto end.

17. A zoom lens unit according to claim 16, which satisfies the condition:

$$0.70 < Y'_{max}/f_w < 1.00 \qquad (5),$$

in which $f_w$ is a focal length of the entire system at the wide angle end, and $Y'_{max}$ is a maximum image height.

18. A zoom lens unit according to claim 1, wherein a magnification ratio is not less than about 4.5 times, and a half field angle at the wide angle end is not less than 38 degrees.

19. An imaging device, comprising:
a light receiving element; and
an optical system for photographing which forms an image of a photographic object onto the light receiving element,
the optical system for photographing including a zoom lens unit comprising:
a first lens group having a positive refracting power;
a second lens group having a negative refracting power; and
a subsequent lens group having one or more lens groups and having a positive refracting power as a whole, said one or more lens groups having a third lens group, the first lens group, the second lens group and the subsequent lens group being arranged in this order from an object side to an image side, an aperture stop disposed between the second lens group and the third lens group, wherein when changing a magnification from a wide angle end to a telephoto end a distance between the first lens group and the second lens group increases, while a distance between the second lens group and the subsequent lens group decreases, wherein a lens construction including the first and the second lens groups satisfies the condition:

$$1.0 < r_i/r_{i+1} < 5.0 \qquad (1),$$

in which r1 and $r_{i+1}$ are curvature radii of lens surfaces $S_i$ and $S_{i+1}$ in the lens construction, respectively, the lens surfaces $S_i$ and $S_{i+1}$ being "i"th and "i+1"th lens surfaces, respectively, counted from the object side, and wherein a reflectivity-reducing treatment adapted to reduce intensity of a ghost image is performed on each lens surface forming at least one of pairs of lens surfaces satisfying the condition (1).

20. A photographing device, including an imaging device comprising:

a light receiving element; and an optical system for photographing which forms an image of a photographic object onto the light receiving element, the optical system for photographing including a zoom lens unit comprising:

a first lens group having a positive refracting power;

a second lens group having a negative refracting power; and a subsequent lens group having one or more lens groups and having a positive refracting power as a whole, said one or more lens groups having a third lens group, the first lens group, the second lens group and the subsequent lens group being arranged in this order from an object side to an image side, an aperture stop disposed between the second lens group and the third lens group, wherein when changing a magnification from a wide angle end to a telephoto end a distance between the first lens group and the second lens group increases, while a distance between the second lens group and the subsequent lens group decreases; wherein a lens construction including the first and the second lens groups satisfies the condition:

$$1.0 < r_i / r_{i+1} < 5.0 \quad (1),$$

in which $r_i$ and $r_{i+1}$ are curvature radii of lens surfaces $S_i$ and $S_{i+1}$ in the lens construction, respectively, the lens surfaces $S_i$ and $S_{i+1}$ being "i"th and "i+1"th lens surfaces, respectively, counted from the object side, and wherein a reflectivity-reducing treatment adapted to reduce intensity of a ghost image is performed on each lens surface forming at least one of pairs of lens surfaces satisfying the condition (1).

21. A photographing device according to claim 20, wherein the photographing device is structured as a camera.

22. A photographing device according to claim 20, wherein the photographing device is structured as a mobile information terminal.

* * * * *